3,764,294
METHOD FOR STIMULATING PLANT GROWTH
George T. Miller, Lewiston, N.Y., assignor to Hooker Chemical Corporation, Niagara Falls, N.Y.
No Drawing. Original application Oct. 3, 1969, Ser. No. 863,687, now Patent No. 3,630,717, and a continuation-in-part of application Ser. No. 603,700, Dec. 1, 1966, now Patent No. 3,472,647. Divided and this application Oct. 28, 1970, Ser. No. 84,948
The portion of the term of the patent subsequent to Oct. 14, 1986, has been disclaimed
Int. Cl. A01n 9/24
U.S. Cl. 71—122    8 Claims

ABSTRACT OF THE DISCLOSURE

A method is described for stimulation of plant growth employing lower aliphatic alcohols of from 1 to 6 carbon atoms as the growth stimulating agent. The alcohol may also be used in an aqueous solution. Growth stimulation is also produced by employing an aqueous alcoholic solution in which soil, in which plants have growth, or plants have been placed and removed when the lower aliphatic alcohol is no longer present.

CROSS REFERENCES

This is a division of our parent application S.N. 863,687, filed Oct. 3, 1969, now U.S. Pat. No. 3,630,717 and is a continuation-in-part of Ser. No. 603,700, filed Dec. 1, 1966, now U.S. 3,472,647, issued Oct. 14, 1969.

BACKGROUND

The treatment of seedlings with alcohols has been described in the literature. However, the prior art is silent with respect to utilization of lower aliphatic alcohols for the treatment of plant environments, in order to stimulate plant growth, in particular stimulation of the amount of fruit produced from a plant. Surprisingly, several prior art references teach the utilization of alcohols and other closely related compounds for inhibiting plant growth. Even when alcohols are used to treat seedlings some of the results were inconsistant and varied, thus no conclusion could be derived.

SUMMARY OF INVENTION

In accordance with the present invention there is provided a method for increasing the amount of fruit produced from plants which comprises applying to the plant environment a fruit increasing amount of lower aliphatic alcohol, having from 1 to 6 carbon atoms. Another aspect of the invention is preparing aqueous solutions of said alcohols.

Inserting or placing soil in which plants have grown or plants into said aqueous solution removing the plants when the alcohol is no longer detectable, and using the resulting solution for application to the plant environment. A further aspect of the invention is the product resulting from the preparation of the solution.

DESCRIPTION OF PREFERRED EMBODIMENTS

The present application is concerned with several alternative methods of stimulating fruit production or plant growth by applying to the plant environment a fruit increasing amount of a lower aliphatic alcohol having from 1 to 6 carbon atoms. By employing the word "fruit" is meant the product of plant growth, the usable or eatable productive body of a plant seed. By the use of the term "plant environment" is meant the environment or surroundings in which the plant is placed such as water in a hydroponic system. Plant environment also includes soil. Growth stimulation means increasing the size and number of root stems and branches of the treated plants.

Another aspect of the invention deals with a method of preparing a growth stimulating solution comprising,
(a) mixing a lower aliphatic alcohol of 1 to 6 carbon atoms in water;
(b) placing soil in which plants have grown or plants in said aqueous solution; and
(c) removing said plants or soil as early as one hour after insertion. The solution is used when the alcohol is no longer dectectable.

An additional optional step includes aerating the solution while the plant or soil is innoculating the solution.

The solution resulting from the above process can be used to stimulate plant growth as well as increase the amount of fruit produced from plants. An easy method to determine the presence of alcohol in an aqueous solution is by means of gas chromatography. A general rule of thumb is when the "milky" appearance of the solution disappears and it becomes clear.

Among the lower aliphatic alcohols that may be employed are methanol, ethanol, propanol, butanol, pentanol, hexanol and mixtures thereof, preferably methanol and ethanol; ethanol is most preferred.

When the solutions of the present invention are employed in soil environments, best results are obtained when the soil is of a poor type. Maximum benefit is evident when soil has been poorly managed so that there is a deficiency in plant growth. This is particularly evident in low humus content soils, usually but not necessarily coincident with a deficiency of nutrient values. The effect is present but less pronounced in well cultivated, well maintained soils. The soil may be treated with the lower aliphatic alcohol prior to the planting of the plant (pretreatment,) after emergence of the plant (post-treatment), or it may be treated concurrently with plating. In pretreatment, the alcohol is applied to the soil from 1 to about 4 weeks and preferably about 2 weeks before planting is accomplished, while in post-treatment, the alcohol is applied to the soil after the plant has been growing for about 1 to about 4 weeks and preferably about 2 weeks.

Normally the amount of alcohol to be used will vary depending upon the types of plants being subjected to treatment, the time of treatment and other conditions. In soil environments from about 50 to about 600 pounds per acre of alcohol, preferably from about 100 to about 300 pounds per acre of alcohol has been found to be effective. Without departing from the scope of the invention, up to about 4800 pounds per acre and less than 50 pounds per acre may be effective with certain plants.

In hydroponic system from about 0.01 percent to about 5 weight percent of alcohol and preferably from about 0.1 weight percent to about 1 weight percent of alcohol is used.

Treatment of the plant environment after multiple planting results in increased growth to the plant that remains. With respect to a second planting, from about 0.2 weight percent to about 10 weight percent of alcohol is used in hydroponic systems, while from about 100 pounds to about 800 pounds per acre of alcohol are used in soil environments. Regarding third and subsequent plantings, greater than about 0.5 weight percent to less than about 20 weight percent of alcohol are used in hydroponic systems while in soil environments from about 150 pounds to 4800 pounds per acre of alcohol are used.

Plant environments treated in accordance with the present invention produce plants having better overall growth due to larger root systems, that is, more roots, which are not only thicker but longer in comparison to the roots of plants which have not acquired the beneficial effects of the alcohol. Also, an increase in the number of blossoms, and an increase in the number of fruit produced results in comparison to untreated plants thereby allowing for more economic production of fruit. Illustrative examples of the plants that may be employed, when the plant environment is treated in accordance with the present invention include among others tomato, cucumbers, legunes, such as string beans, soybeans, etc., beet, radish, sugar beet, etc.

The alcohol may be applied to the soil in any of a variety of ways such as by applying the compound in the pure form, in a water solution or with a carrier such as clay, limestone, carbon and the like as optional ingredients. Formulation adjuvants as is customarily employed in the pesticide art may also be employed in the present invention such as surfactants, dispersants, sticking agents, sequestering agents and the like. The alcohol or its solution can be applied to the surface of the soil by spraying, thereby allowing it to penetrate the soil or can be mixed with irrigation water that is being used for watering plants.

Normally the alcohol is used as a solution with water, preferably distilled water, although water commonly used to water plants can be used.

It has also been determined that a solution can be treated with soil in which plants have grown or with plants, i.e., plants or soil are placed in the aqueous solution and preferably removed before the solution is used. The solution is ready for use when the alcohol is no longer detectable. This process normally takes between 7–28 days. Plants that may be used to treat the aqueous alcoholic solution are the dioctylodoneae or monocotylodoneae as described in the "World of Plant Life" (1945) by C. J. Hylander. Some of the monocotylodoneae that may be used are grasses, lilies, irises and the like. Among the dicots that may be used are of the nightshade family, the pea family, the carrot family, the pink family and the like. Tomato plants are particularly suitable. When the alcohol is no longer detectable in the solution, it is termed the "alcoholic culture." This solution could then be evaporated to dryness. The resulting material may subsequently be added to water to make an aqueous solution and the latter solution is used to treat the plant environment. The latter solution has been termed "alcoholic culture concentrate." The dry solid material resulting from evaporation may be directly applied to plant environment, with or without additional fertilizer. The dry solids may be applied to the plant environment at a rate of about 5 to about 500 pounds/acre of soil, preferably about 20 to about 400 pounds/acre and even more preferably, about 20 to about 100 pounds/acre.

As can be seen, there are a number of alternative ways of applying alcoholic solutions, alcoholic cultures, alcoholic culture concentrates (dry or reconstituted), with or without fertilizers.

Various grades of alcohol can be used such as pure alcohol or denaturated alcohol which may contain various amounts of denaturants such as benzene, pyridene and other denaturing agents. A preferred alcohol is ethyl alcohol, i.e., pure ethyl alcohol, 99.5%, about 190 proof. A preferred denatured alcohol is one known as 28 ethyl alcohol which contains one-half gallon of benzene per 100 gallons of 190 proof ethyl alcohol. It is, of course, appreciated that other forms of lower aliphatic alcohol or its solutions can be used without departing from the scope of the invention.

In those instances where a fertilizer solution was used together with the alcohol or its solution, the fertilizer used may be those that are commonly available. These fertilizers may be totally soluble plant foods such as Nutro®, Rapid Grow® or other commercially available plant foods. Generally these fertilizers are high analysis fertilizers, being comprised of 23 percent nitrogen, 17 percent phosphorus and 18 percent potash, the remainder of the fertilizer being comprised of minor amounts of material and a substantial amount of filler materials. Other fertilizers that may be employed comprise from about 5 to 25 percent nitrogen, about 5 to about 25 percent phosphorus and about 5 to about 25 percent potash. All percentages are by weight. It is appreciated that other fertilizer solutions containing more or less than the above ingredients can be employed without departing from the scope of the present invention.

The following examples illustrate the preferred embodiments of the invention. Unless otherwise indicated, all parts and percentages used herein are by weight and all temperatures are in degrees centigrade. In hydroponic systems, twice a week a source of ferrous ions was used such as a 2 cc./liter solution of 0.002 M $FeSO_4$ adjusted to a pH of 3.5 with sulfuric acid. Rates of application are described in pounds/acre, see "A Manual of Conversion Tables, Equivalents and Dosage Calculations" compiled by H. T. Strev, November 1963.

Example 1

Soil, as obtained from Grand Island, N.Y., close to the Hooker Research Laboratories, was sterilized by heating it in an oven at about 120 degrees centigrade for a period of about 16 hours. Portions of the sterilized soil were placed in containers, the bottom of the containers containing small mats of glass wool in order that the soil would be retained on them. In each of three of these containers were placed 1,500 grams of the sterilized soil. To the soil in two of the containers, 1–2, there were added the amounts of 2B ethyl alcohol as illustrated in Table I, and 150 milliliters of distilled water. To container 3, which was a control, 150 milliliters of distilled water only was added. The soil was permitted to stand for a period greater than one hour, then the soil in all three containers were mixed by emptying the contents of the containers on paper, admixing the contents with a spatula and returning the admixed contents to the respective containers.

Young tomato plants three inches tall were then added to containers 1–3 in the greenhouse. The containers were observed about one month later and rated, the results being listed in Table I. The rating scale used throughout spans from 0 to 10. A zero rating signifies the plant was dead, while a rating of 10 signifies approximately 100 percent plant growth in excess of a plant with a rating of 5 (control). The rating was based on the length of the stems, thickness of the stems, size of leaf structure, distances between the leaves, color, and similar characteristics of plants which are used in determining the health and vigor of the plants.

TABLE I

| Container number | Amount of $C_2H_5OH$ added in grams | Rating |
| --- | --- | --- |
| 1 | 1.5 (1,200 pounds/acre) | 8 |
| 2 | 0.37 (300 pounds/acre) | 7 |
| 3 | 0 | 5 |

The tomato plants in containers 1 and 2 were superior in size as compared to the plant in container 3. Not only were the plants in containers 1 and 2 significantly taller, but the stems of the plants were thicker, there were more of them, and the root system of these plants were highly developed as compared to the plant in container 3. That is they were thicker, longer, and there were more of them.

In a similar manner cucumbers and beans are planted, and rated with substantially the same results.

Example 2

A second group of testes were accomplished concurrent with the tests are effected in Example 1 in order to determine the effect of fertilizer.

A stock solution was prepared by dissolving two large teaspoons of Nutro® plant food crystals in one-half gallon of water. Portions of this solution, 100 milliliters, were applied to the same sterilized soil as used in Example 1, together with 50 milliliters of distilled water, and different amounts of 2B ethyl alcohol, as illustrated in Table II. Four containers were used, containers 4–5, container 7 being the control, each container containing about 1,500 grams of soil.

Young tomato plants three inches tall were then added to containers 4–7 in the greenhouse. The containers were observed about one month later and the plants contained therein were rated, the results being listed in Table II.

TABLE II

| Container number | Amount of $C_2H_5OH$ added in grams | Rating |
| --- | --- | --- |
| 4 | 6 (4,800 pounds/acre) | 9 |
| 5 | 1.5 (1,200 pounds/acre) | 7 |
| 6 | 0.37 (300 pounds/acre) | 9 |
| 7 | 0 | 5 |

Example 3

In soilless cultures (hydroponic systems), the use of varying amounts of 2B ethanol were tested for growth stimulation of plants. The tests were accomplished in 250 milliliter beakers covered with a rubber dome to prevent evaporation, avoid contamination and the like. Beakers 1, 2, 3 and 4 contained 200 milliliters of a fertilizer solution. Additionally, beakers 1, 2 and 3 contained amounts of ethanol, as reported in Table III. Beaker 4 was the control beaker and contained no ethanol. The fertilizer solution was prepared by dissolving one-quarter of a teaspoon of Nutro plant food crystals per one-half gallon of distilled water.

Young tomato plants about three inches tall were placed in the beakers, 1–4, at the same time. Aeration of the solutions was then accomplished by bubbling air through them, and periodic additions of a small amount of ferrous sulfate, less than 0.5 grams, were equally made to each beaker. The plants were rated about a month later. The results are reported in Table III.

In a second series of tests, beakers 5–8 contained 200 milliliters of a fertilizer solution prepared by dissolving ⅜ of a teaspoon of Nutro food crystals per gallon of water, and amounts of ethyl alcohol as reported in Table III. Beaker 9 was a control beaker and contained no ethanol. Aeration of the solution, and addition of ferrous sulfate was accomplished as done above with beakers 1–4.

A group of young tomato plants were placed in these beakers and removed a month later. A second group of young tomato plants were placed in beakers 5–9 without changing the solutions. The plants were rated about one month later. The results are tabulated in Table III.

TABLE III

| Beaker number | Amount of 2B ethanol, percent | Rating |
| --- | --- | --- |
| 1 | 0.2 | 8 |
| 2 | 0.1 | 8 |
| 3 | 0.05 | 6 |
| 4 (control) | 0 | 5 |
| 5 | 0.1 | 5 |
| 6 | 0.2 | 5 |
| 7 | 0.5 | 8 |
| 8 | 1.0 | 10 |
| 9 (control) | 0 | 5 |

NOTE.—Beakers 1–4, results based on first planting. Beakers 5–9, results based on second planting.

In a similar manner cucumbers and beans are planted and rated with substantially the same results.

Example 4

A solution comprised of 10 grams of ethyl alcohol per liter of water was prepared by dissolving the ethyl alcohol in water and various amounts of this solution were added to soil contained in a number of containers, as reported in Table IV. Each container contained about 200 milliliters of soil. The soil itself was comprised of approximately equal quantities by volume of sterilized sandy loam, peat moss and vermiculite. Water, 25 milliliters, was added to each of the containers in order to moisten the soil.

Groups of six containers containing the above materials were placed in plastic pans 6 containers per pan. The containers in each of the pans were exposed to a light source, consisting of two double Gro-Lux® fluorescent lighting fixtures (40 watts each, 48 inches long), suspended 15 inches above the tops of the containers. The lights were timed to operate for 14 hours per day.

The contents of the six containers in each pan were treated with equal amounts of the ethyl alcohol solution, ecept for the control which was not treated with ethyl alcohol. Thus the contents of the containers in pan 1, containers a, b, c. d, e, and f were not treated with the ethyl alcohol solution and the contents of the six containers in pan 2, a, b, c, d, e, and f were treated with 1.25 milliliters of the ethyl alcohol solution. Similar treatments were effected to the contents of the containers in pans 3, 4, and 5 as illustrated in Table VI below.

One tomato and one cucumber plant were planted in each of the 4 containers in each pan, while 2 containers in each pan were allowed to remain fallow. About two weeks later, 25 milliliters of 0.4 percent fertilizer was added to each container. One day after the fertilizer addition, the plants were removed from 2 containers in each pan. These plants were replaced by new tomato and cucumber plants, designated c and d in Table IV. At this time, the 2 containers that had been allowed to remain fallow were planted with one tomato and one cucumber plant per container, e and f in Table IV. About one month later, the plants were visually rated for growth characteristics, as accomplished in Example 1. The results are reported in Table IV.

TABLE IV (A) First planting after treatment

| Pot number | Milliliters of solution added (lbs./acre) | Rating,[1] tomatoes | | Rating,[1] cucumbers | |
| --- | --- | --- | --- | --- | --- |
| | | Roots | Tops | Roots | Tops |
| 1a and 1b | 0 | 5 | 5 | 5 | 5 |
| 2a and 2b | 1.25 (75) | 8 | 5 | 7 | 6 |
| 3a and 3b | 2.5 (150) | 8 | 5 | 5 | 7 |
| 4a and 4b | 5 (300) | 8 | 5 | 7 | 9 |
| 5a and 5b | 10 (600) | 8 | 7 | 5 | 5 |

[1] Based on rating average of 2 containers in each instance.

In a similar manner cucumbers, beans, and radishes are planted, and rated with substantially the same results.

(B) Second planting, tomatoes only, same amounts of solution as used in Section A

| Pot number | Roots | | | Tops | | |
| --- | --- | --- | --- | --- | --- | --- |
| | Weight in grams | Rating[1] | Length in inches | Weight in grams | Rating[1] | Length in inches |
| 1c and 1d | 0.58 | 5 | 4  6.50 | 5.5 | 5 | 8  10.75 |
| 2c and 2d | 1.20 | 7 | 8  8.50 | 8.2 | 6 | 7  11.25 |
| 3c and 3d | 1.47 | 8 | 8    6 | 8.6 | 7 | 9.75  11.50 |
| 4c and 4d | 0.81 | 7 | 8.50  5.25 | 6.8 | 6 | 8.50  9.50 |
| 5c and 5d | 0.50 | 5 | 6  5.50 | 5.2 | 5 | 7    9 |

(C) Fallow then planted, same amounts of solution as used in Section A

| 1e and 1f | 1.03 | 5 | 5  7.50 | 9.4 | 5 | 9  12.5 |
| --- | --- | --- | --- | --- | --- | --- |
| 2e and 2f | 1.84 | 6 | 9   12 | 14.3 | 7 | 11.5  15 |
| 3e and 3f | 1.28 | 5 | 6    7 | 14.9 | 6 | 13  13.5 |
| 4e and 4f | 1.42 | 6 | 6.50  7.50 | 13.2 | 6 | 11.5  14 |
| 5e and 5f | 1.13 | 5 | 6.50  5 | 12.9 | 6 | 12  12 |

[1] Based on an average rating of 2 containers in each instance.

In a similar manner cucumbers, beans, and radishes are planted, and rated with substantially the same results.

Example 5

Field plots, 5 feet by 8 feet, were treated with an ethyl alcohol solution containing the amounts of ethyl alcohol as reported in Table V. These plots were seeded with tomatoes, corn, sugar beets, beans, cucumbers, cotton and several grasses. The plants were rated about four months later, the results being reported in Table V. This treatment was identified as pre-treatment. The soil was also treated after the plants had been growing about two weeks. This treatment was identified as post-treatment.

TABLE V

| Plot number | Ethanol | Grams Tomato fruit per plant | Weight of total tomato plant | Sugar beet root | Weight of total sugar beet plant |
|---|---|---|---|---|---|
| 1 (control) | 0 | 12 | 47 | 900 | 1,950 |
| 2 | 23 | 65 | 118 | 1,250 | 2,600 |
| 3 | 45.4 | 32 | 67 | 1,500 | 3,100 |
| 4 | 68 | 63 | 112 | 1,250 | 2,600 |
| 5 | 90 | 35 | 80 | 1,100 | 2,300 |
| 6 | 135 | 32 | 67 | 1,050 | 2,050 |
| 7 (control) | 0 | 6 | 35 | 500 | 1,400 |
| 8 | 23 | 48 | 84 | 810 | 2,200 |
| 9 | 45.4 | 16 | 37 | 580 | 1,520 |
| 10 | 68 | 18 | 53 | 720 | 2,000 |
| 11 | 90 | 19 | 42 | 720 | 1,500 |
| 12 | 135 | 94 | 172 | 780 | 2,450 |

NOTE.—Plots 1–6, pretreatment. Plots 7–12, post-treatment.

In a similar manner cucumber, beans, and radishes are planted, and rated with substantially the same results.

Example 6

An aqueous ethanol solution was prepared. Two tomato plants which were growing in a vermiculite soil and about 3–4 inches high were washed free of soil with distilled water. No soil was on the tomato roots. The plants were placed in the ethanol solution for 10 days at which time the solution was no longer "milky" in appearance. The solution was continuously aerated. The plants were removed and the liquid used to treat soil as listed below. Soil, prepared similar to that described in Example 1, was placed in each pot. The solution was evenly applied concurrent with planting. All tests were carried out with 9 replicates (3 plants/pot and 3 pots). Blossoms were picked twice a week. None were permitted to develop into fruit. The results are listed in Table VI. Amount of ethanol in each solution is described as lbs./acres applied to soil.

TABLE VI

| Rate of fertilizer applied (lbs./acre) [1] | Rate of ethanol applied (lbs./acre) | No. of blooms (control) [2] | Average plant wt. (percent of control wt.) [3] |
|---|---|---|---|
| 0 | 100 | 16 (2) | 161 |
| 0 | 300 | 9 (2) | 164 |
| 500 | 200 | 39 (16) | 148 |
| 1,000 | 100 | 86 (18) | 139 |
| 1,000 | 300 | 90 (10) | 134 |

[1] Fertilizer contained 10% nitrogen, 10% $P_2O_5$ and 10% $K_2O$.
[2] Number of blooms of control is in parenthesis.
[3] Control is considered as a base of 100%.

As can be seen, the solution, in which no alcohol was detectable stimulated plant growth as well as increased the product of plant growth, i.e., the number of blossoms. Note the improvement with and without fertilizer.

Example 7

Aqueous solution of 0.06% Nutro® were prepared with varying amount of ethanol. Three tomato plants per beaker prepared according to Example 6, were suspended in each solution. Air was bubbled through. After determining by gas chromatography that no ethanol was present, some of the solutions were evaporated to dryness. The solution wherein no ethanol is present is termed "ethanol culture." The material resulting from the evaporation was then reconstituted to the original volume by adding water to the solids resulting from evaporation. This resulting solution is termed "ethanol culture concentrate (ECC)." After 17 days of growth, the tomato growth results (average of five beakers) are listed below as a weight percent increase of control. Concentration of ethanol is expressed in terms of amount of ethanol in original solution prior to insertion of plants and prior to evaporation.

| Type and amount of growth stimultant: | Weight percent increase of control |
|---|---|
| 0.02% ethanol culture | 66 |
| 0.2% ethanol culture | 117 |
| 2.0% ethanol culture | 240 |
| 0.02% ethanol culture concentrate | 80 |
| 0.2% ethanol culture concentrate | 148 |
| 2.0% ethanol culture concentrate | 165 |

Example 8

Soil near Grand Island, N.Y. was thoroughly mixed at the ratio of 3 parts to one part vermiculite. Nutro® fertilizer was applied at the rate of 250 lbs./acre. Pots were prepared with the soil mixture. Five snap beans and 20 radish seeds were planted per pot, later thinned to 2 bean plants and 5 radish plants per pot. Aqueous growth stimulant solutions were prepared with varying amounts of growth stimulants as listed below. Ethanol culture solutions and ethanol culture concentrate solutions were also prepared according to the procedure of Example 7. The beans were harvested after 54 days of growth. For ethanol culture and culture concentrate, the growth period was 57 days. The results for radish growth are not reported because of apparent competition with beans. Radish growth was too variable.

| Type and amount of growth stimulant (lbs./acre) | Number of beans harvested | Average wt. percent of control |
|---|---|---|
| Only fertilizer | 70 | 100 |
| Ethanol: | | |
| 50 | 45 | 133 |
| 150 | 65 | 131 |
| 300 | 56 | 157 |
| Methanol: | | |
| 50 | 52 | 191 |
| 150 | 79 | 334 |
| 300 | 101 | 453 |
| Propanol: | | |
| 50 | 76 | 254 |
| 150 | 75 | 186 |
| 300 | 77 | 281 |
| Butanol: | | |
| 50 | 70 | 276 |
| 150 | 72 | 178 |
| 300 | 44 | 119 |
| Ethanol culture: [1] | | |
| 50 | 54 | 145 |
| 100 | 47 | 60 |
| 200 | 61 | 219 |
| Ethanol culture concentrate: [1] | | |
| 50 | 46 | 134 |
| 100 | 59 | 186 |
| 200 | 32 | 64 |

[1] The rate of application of ethanol culture and ethanol culture concentrate is based on the amount of ethanol originally present in aqueous solution. An external toxic chemical affected all ethanol culture and culture concentrates in greenhouse but in particular the 100 lbs./acre EC and 50 lbs./acre and 200 lbs./acre ECC.

As can be seen all of the compounds increased the amount of fruit produced over the control. Similarly good results are obtained when culture and culture concentrates of methanol, propanol, butanol, pentanol and hexanol are employed.

Example 9

Three ethanol solutions were prepared. Solution I contained 0.06% of Nutro®. Two tomato seedlings (3–4 inches high) prepared according to Example 6, were placed in the solution for an inoculation period of about 24 days. These seedlings were replaced by one tomato seedling.

Solution II was prepared similar to Solution I except the inoculation period was only 24 hours. The two seedlings were then removed and the beaker remained idle for the remaining 23 days. Then a tomato plant was inserted.

Solution III was prepared similar to Solution II except 6 gms. of well cultivated topsoil was used in place of the tomato plants. After a 24 inoculation period the liquid was decanted. At the end of the 24 days, a tomato plant was inserted. All solutions were aerated for the 24 days. All solutions were brought to a 250 ml. level by addition of water thereto.

The results of a 17 day growing period are listed below. The results are an average of three replicates.

| Solution | Weight percent Amount of ethanol | Average increase of plant |
|---|---|---|
| I | 0 | 6 |
|   | 0.2 | 5 |
|   | 0.5 | 48 |
| II | 0 | −1 |
|   | 0.2 | 26 |
|   | 0.5 | 50 |
| III | 0 | 35 |
|   | 0.2 | 55 |
|   | 0.5 | 63 |

The above table shows that when ethanol is no longer detectable in a solution; significant growth stimulation results whether the inoculating agent is a plant or soil.

While there have been described various embodiments of the invention, the compositions and methods described are not intended to be understood as limiting the scope of the invention as it is realized that changes therewithin are possible, and it is further intended that each element recited in any of the following claims is intended to be understood as referring to all equivalent elements for accomplishing substantially the same results in substantially the same or equivalent manner, it being intended to cover the invention broadly in whatever form its principles may be utilized.

What is claimed is:

1. A method for stimulating plant growth which comprises applying to the plant environment a growth stimulating amount of a solution prepared by a process comprising
    (a) forming an aqueous solution by mixing a lower aliphatic alcohol with water;
    (b) placing a plant in said aqueous solution for at least one hour;
    (c) removing the plant from said aqueous solution;
    (d) storing said aqueous solution until the alcohol is no longer detachable therein.
2. The method of claim 1 wherein the solution is aerated during step (b).
3. The method of claim 1 wherein said lower aliphatic alcohol is ethyl alcohol.
4. The method of claim 1 wherein soil is used in place of a plant in step (b).
5. The method of claim 1 wherein the solution resulting from step (c) is evaporated to dryness.
6. The method of claim 2 wherein the dry material is added to an aqueous solution.
7. The method of claim 1 wherein the plant remains in the solution until the alcohol is no longer detectable in said solution.
8. The method of claim 4 wherein the soil remains in the solution until the alcohol is no longer detectable in the solution.

References Cited

UNITED STATES PATENTS 3,472,647   10/1969   Miller _____ 71—122

FOREIGN PATENTS 1,029,155   5/1966   Great Britain _____ 71—77

OTHER REFERENCES

Miroshnichenko, Chemical Abstracts, vol. 42, col. 6486(e), 1948.

JAMES O. THOMAS, Jr., Primary Examiner

U.S. Cl. X.R.

47—1.2

PO-1050
(5/69)

UNITED STATES PATENT OFFICE
CERTIFICATE OF CORRECTION

Patent No. 3,764,294      Dated October 9, 1973

Inventor(s)    George T. Miller

It is certified that error appears in the above-identified patent and that said Letters Patent are hereby corrected as shown below:

Column 1, line 16, Abstract should read

--- A method for stimulating plant growth is described by applying to the plant environment a growth stimulating amount of the product resulting from mixing a lower alkyl alcohol with water; placing a plant in said aqueous solution for at least one hour; and storing the solution until the alcohol is no longer detectable in the solution.---
Column 2, line 12, "dectectable" should read ---detectable---; line 38, "plating" should read ---planting---. Column 3, line 9, "legunes" should read ---legumes---; line 58, "denuatured" should read ---denatured---; line 62, "28" should read ---2B---. Column 4, line 61, "were highly" should read ---were more highly---. Column 5, line 2, "4-5" should read ---4-7---; line 19, "28" should read ---2B---. Column 6, line 10, "ecept" should read ---except---. Column 10, line 3, "detachable" should read ---detectable---.

Signed and sealed this 21st day of January 1975.

(SEAL)
Attest:

McCOY M. GIBSON JR.
Attesting Officer

C. MARSHALL DANN
Commissioner of Patents